(12) United States Patent
Hoch et al.

(10) Patent No.: US 12,726,452 B1
(45) Date of Patent: Sep. 1, 2026

(54) POLICY VIOLATION DETECTION IN ELECTRONIC MESSAGES

(71) Applicant: NEC Corporation Of America, Herzlia (IL)

(72) Inventors: Yaacov Hoch, Ramat-Gan (IL); Ekaterina Feldman, Tirat Carmel (IL)

(73) Assignee: NEC Corporation Of America, Herzlia (IL)

( * ) Notice: Subject to any disclaimer, the term of this patent is extended or adjusted under 35 U.S.C. 154(b) by 37 days.

(21) Appl. No.: 19/068,104

(22) Filed: Mar. 3, 2025

(51) Int. Cl.
*H04L 51/212* (2022.01)
*G06Q 10/107* (2023.01)

(52) U.S. Cl.
CPC ......... *H04L 51/212* (2022.05); *G06Q 10/107* (2013.01)

(58) Field of Classification Search
CPC ............................ H04L 51/212; G06Q 10/107
See application file for complete search history.

(56) References Cited

U.S. PATENT DOCUMENTS

| | | | | |
|---|---|---|---|---|
| 12,641,064 | B1 * | 5/2026 | Wilson | H04L 63/0428 |
| 2025/0045150 | A1 * | 2/2025 | Agrawal | G06F 11/3684 |
| 2026/0044610 | A1 * | 2/2026 | Rajaretnam | G06F 11/3006 |
| 2026/0073028 | A1 * | 3/2026 | Belgi | G06F 21/31 |

* cited by examiner

*Primary Examiner* — Minh Chau Nguyen

(57) ABSTRACT

There is provided a method of automatic identification of violation of a content policy, comprising: filtering at least one electronic message likely violating at least one policy clause of a content policy being exchanged over a network, prompting a large language model (LLM) with a set of closed-ended prompts corresponding to the at least one policy clause and referring to the at least one electronic message, for each respective closed-ended prompt to which the LLM provides a target response, dynamically interpolating a template prompt corresponding to the respective closed-ended prompt with combinations of entities extracted from the at least one electronic message, prompting the LLM with the interpolated template prompt, computationally evaluating whether the at least one policy clause is violated according to an analysis of responses from the LLM to the interpolated template prompt, and instructing access control for the at least one electronic message violating the access policy.

17 Claims, 6 Drawing Sheets

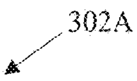

From: John Smith, VP of Operations, Company A
To: Sarah Johnson, Director of Permits, Government Agency B
Subject: Request for Guidance on Project Approval Dear Ms. Johnson, I hope this email finds you well. I am reaching out regarding the permit approval for Project XYZ. We are eager to move forward and believe this project will bring significant benefits to the local community.

If there are any challenges or roadblocks in the approval process, please don't hesitate to let me know. We highly value your guidance and are committed to making this process as smooth as possible for everyone involved.

Thank you for your time and support.

Best regards,
John Smith
VP of Operations
Company A

---

302B

From: John Smith, VP of Operations, Company A
To: Sarah Johnson, Director of Permits, Government Agency B
Subject: RE: Request for Guidance on Project Approval Dear Ms. Johnson, Thank you for your prompt response to my previous email. I understand that the approval process can be complex and time-consuming, and I want to express our appreciation for your hard work in ensuring everything proceeds as planned.

As a token of our gratitude, we would be delighted to offer you VIP tickets to X event. Please let us know if this would be of interest to you.

We are confident that your expertise and support will help us overcome any remaining challenges in finalizing the approval.

Looking forward to hearing from you.

Warm regards,
John Smith

FIG. 3

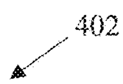

Content Policy – The following are prohibited:

1. Discussing unusual payment practices, such as payments to personal accounts, requests for payment to unrelated third parties, or mention of cash, cryptocurrencies, or other untraceable payment methods.
2. Offering or promising gifts, entertainment, travel, or hospitality to decision-makers.
3. Requests to bypass standard processes, for example:
   - "Can we skip the usual approval steps?"
   - "This doesn't need to go through the formal channels."
   - "Let's handle this quietly."

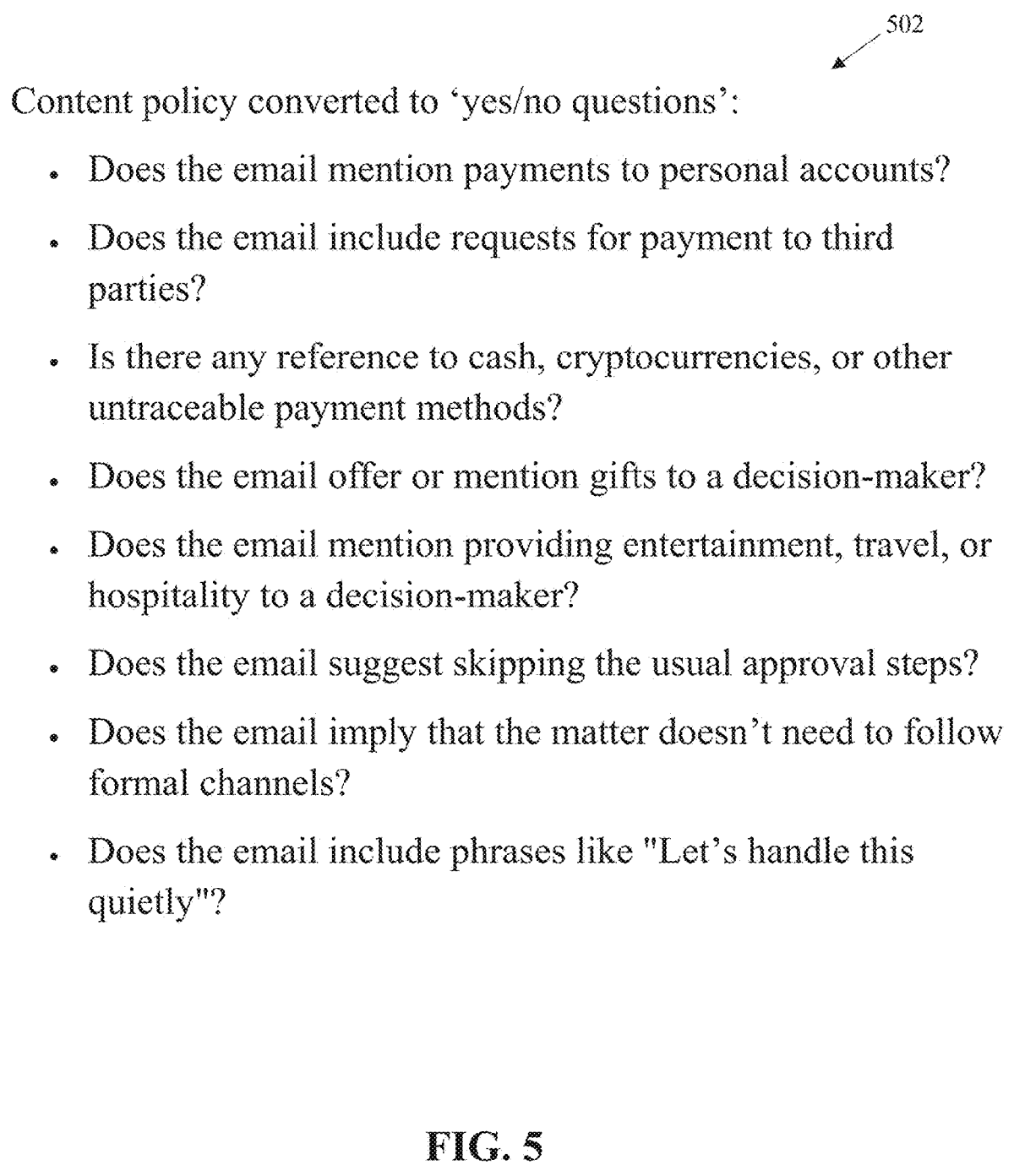

Content policy converted to ‘yes/no questions’:

- Does the email mention payments to personal accounts?
- Does the email include requests for payment to third parties?
- Is there any reference to cash, cryptocurrencies, or other untraceable payment methods?
- Does the email offer or mention gifts to a decision-maker?
- Does the email mention providing entertainment, travel, or hospitality to a decision-maker?
- Does the email suggest skipping the usual approval steps?
- Does the email imply that the matter doesn’t need to follow formal channels?
- Does the email include phrases like "Let’s handle this quietly"?

FIG. 5

POLICY VIOLATION DETECTION IN ELECTRONIC MESSAGES

BACKGROUND

The present invention, in some embodiments thereof, relates to artificial intelligence models and, more specifically, but not exclusively, to artificial intelligence models for detection of violation of a content policy in electronic messages.

An email content policy defines rules to ensure email communication is appropriate, professional, and compliant with laws and regulations. It typically prohibits spam, offensive language, phishing, misleading content, and unauthorized data sharing.

SUMMARY

According to a first aspect, a computer implemented method of automatic identification of violation of a content policy, comprises: filtering at least one electronic message likely violating at least one policy clause of a content policy being exchanged over a network, prompting a large language model (LLM) with a set of closed-ended prompts corresponding to the at least one policy clause and referring to the at least one electronic message, for each respective closed-ended prompt to which the LLM provides a target response, dynamically interpolating a template prompt corresponding to the respective closed-ended prompt with a plurality of combinations of a plurality of entities extracted from the at least one electronic message, prompting the LLM with the interpolated template prompt, computationally evaluating whether the at least one policy clause is violated according to an analysis of responses from the LLM to the interpolated template prompt, and instructing access control for the at least one electronic message violating the access policy.

According to a second aspect, a system for automatic identification of violation of a content policy, comprising: at least one processor executing a code for: filtering at least one electronic message likely violating at least one policy clause of a content policy being exchanged over a network, prompting the LLM with a set of closed-ended prompts corresponding to the at least one policy clause and referring to the at least one electronic message, for each respective closed-ended prompt to which the LLM provides a target response, dynamically interpolating a template prompt corresponding to the respective closed-ended prompt with a plurality of combinations of a plurality of entities extracted from the at least one electronic message, prompting the LLM with the interpolated template prompt, computationally evaluating whether the at least one policy clause is violated according to an analysis of responses from the LLM to the interpolated template prompt, and instructing access control for the at least one electronic message violating the access policy.

According to a third aspect, a non-transitory medium storing program instructions for automatic identification of violation of a content policy, which when executed by at least one processor, cause the at least one processor to: filter at least one electronic message likely violating at least one policy clause of a content policy being exchanged over a network, prompt the LLM with a set of closed-ended prompts corresponding to the at least one policy clause and referring to the at least one electronic message, for each respective closed-ended prompt to which the LLM provides a target response, dynamically interpolate a template prompt corresponding to the respective closed-ended prompt with a plurality of combinations of a plurality of entities extracted from the at least one electronic message, prompt the LLM with the interpolated template prompt, computationally evaluating whether the at least one policy clause is violated according to an analysis of responses from the LLM to the interpolated template prompt, and instruct access control for the at least one electronic message violating the access policy.

In a further implementation form of the first, second, and third aspects, the LLM generates responses to the interpolated template prompt using a retrieval-augmented generation for question answering (RAG QA) architecture, wherein the at least one electronic message comprises a thread of a plurality of electronic messages, each electronic message of the plurality of electronic messages is treated as an independent chunk of data, and instructing a retriever model to select relevant chunks for prompting the LLM in association with the interpolated template prompt.

In a further implementation form of the first, second, and third aspects, a plurality of chunks from a plurality of different electronic messages of the thread relevant to the interpolated template prompt are selected by the retriever model for prompting the LLM.

In a further implementation form of the first, second, and third aspects, the at least one electronic message comprises a thread of emails exchanged between a plurality of participants.

In a further implementation form of the first, second, and third aspects, the template prompt is dynamically selected from a plurality of template prompts according to a correlation with the at least one policy clause likely violated by the at least one electronic message.

In a further implementation form of the first, second, and third aspects, the content policy is written in a natural language text, and further comprising processing the at least one policy clause of the content policy using a natural language processing (NLP) process, and converting the at least one policy clause to the set of closed-ended prompts according to the processing.

In a further implementation form of the first, second, and third aspects, the closed-ended prompts comprise a plurality of closed-ended questions designed to elicit a binary response from the LLM, wherein the target response is a pre-selected binary response selected from yes or no.

In a further implementation form of the first, second, and third aspects, entities are extracted from a body of the at least one electronic message excluding headers and/or indications of to/from sending of the at least one electronic message.

In a further implementation form of the first, second, and third aspects, further comprising: identifying missing data in the interpolated template prompt, automatically generating a fake electronic message designed to elicit the missing data, sending the fake electronic message from a bot to at least one target participant selected from the participants participating in the exchange of the at least one electronic message, and extracting the missing data from a response electronic message to the fake electronic message by the at least one target participant.

In a further implementation form of the first, second, and third aspects, the missing data is selected from: a role of the at least one target participant, location of the at least one target participant in a hierarchy, evidence of an event that happened involving the at least one target participants, and evidence of a granting of a gift to/from the at least one target participants.

In a further implementation form of the first, second, and third aspects, further comprising: identifying missing data in the interpolated template prompt, wherein the LLM generates responses to the interpolated template prompt using a RAG QA architecture, and instructing a retriever model to access an external dataset for obtaining the missing data for prompting the LLM in association with the interpolated template prompt.

In a further implementation form of the first, second, and third aspects, a plurality of instances of the template prompt are each interpolated with a respective permutation of the plurality of entities.

In a further implementation form of the first, second, and third aspects, instructing access control comprises blocking transmission of the at least one electronic message violating the access policy.

In a further implementation form of the first, second, and third aspects, instructing access control comprises automatically suspending an account of a target participant identified as sending the at least one electronic message violating the access policy.

In a further implementation form of the first, second, and third aspects, further comprising: identifying at least one target entity violating the access policy, identifying a chunk of content of the at least one electronic message used as basis for determining violation of the access policy, and generating a violation report including the at least one target entity violating the access policy and the chunk of content.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 includes a thread of two emails which are being evaluated for violation of a content policy, in accordance with some embodiments of the present invention;

FIG. 4 includes an example of a content policy, in accordance with some embodiments of the present invention;

FIG. 5 depicts examples of closed-ended prompts created from the content policy of FIG. 4, in accordance with some embodiments of the present invention.

DETAILED DESCRIPTION

Figure 1:
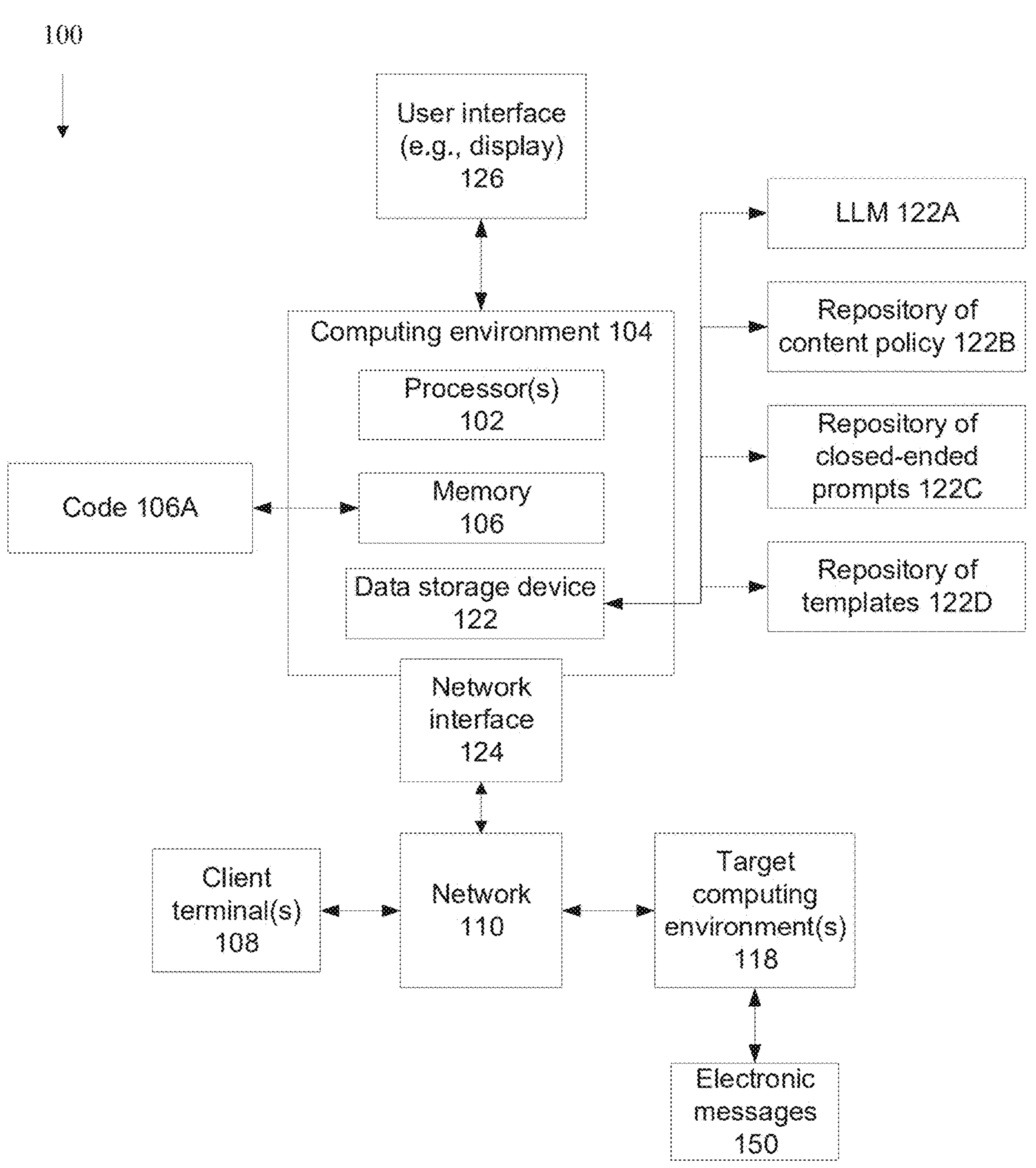
FIG. 1 is a block diagram of components of a system for automatic identification of violation of a content policy of electronic messages using a LLM, in accordance with some embodiments of the present invention.

The present invention, in some embodiments thereof, relates to artificial intelligence models and, more specifically, but not exclusively, to artificial intelligence models for detection of violation of a content policy in electronic messages.

An aspect of some embodiments of the present invention relates to systems, methods, devices, and/or code instructions (e.g., stored on a data device and executable by one or more processors for automatic identification violation of a content policy. The following may be implemented by one or more processors executing code. Electronic messages likely violating at least one policy clause of a content policy are monitored, optionally filtered. The electronic messages are being exchanged over a network. A large language model (LLM) is prompted with a set of closed-ended prompts corresponding to the policy clause(s) and referring to the electronic message(s). For each respective closed-ended prompt to which the LLM provides a target response, a template prompt corresponding to the respective closed-ended prompt is dynamically interpolated with combinations of entities extracted from the electronic message(s). The LLM is prompted with the interpolated template prompt. The processor computationally evaluates whether the policy clause(s) is violated according to an analysis of responses from the LLM to the interpolated template prompt. The processor instructs access control for the electronic message(s) violating the access policy.

At least one embodiment described herein addresses the technical problem of automatically identifying a violation of a content policy in electronic messages. At least one embodiment described herein improves the technology of automatic identification of a violation of a content policy in electronic messages. At least one embodiment described herein improves over prior approaches of automatically identifying a violation of a content policy in electronic messages. At least one embodiment described herein provides a practical application for automatically identifying a violation of a content policy in electronic messages.

The problem of policy violation detection in emails or other types of electronic messages may refer to identifying electronic messages that do not comply with a content policy, for example, specific rules, guidelines and/or regulations. Content policy enforcement may be a significant issue in many different domains, for example, compliance with legal and/or industry regulations like GDPR or HIPAA, data security and/or promotion of safe and respectful communications at workplace and/or in social media. Some of the challenges that content policy enforcement faces, include for example: accurately interpreting users' intent, detecting intentionally evasive language, and understanding the context across conversation. Some existing approaches of detecting content policy violation are based on domain-specific keywords detection, anomaly detection and/or fine-tuning a language model on a labeled dataset.

Keywords detection, which searches for presence of specific keywords or phrases, is a fast and easy method to develop, but it suffers from producing large number of false positives and lack of contextual understanding. In contrast, at least one embodiment described herein may provide a lower false positive rate and/or better contextual understanding that the keyword detection approach.

Anomaly detection indicates deviations from normal communications patterns and can learn directly from data, but it has limited interpretability, making it difficult to determine who and/or what triggered the anomaly. Other black-box approaches at best can only predict whether or not there is a presence of violation of the content policy, but cannot indicate why a violation was predicted and/or who violated the policy. Moreover, anomaly detectors need to be re-trained to be able to catch a new or evolving suspicious behavior. In contrast, at least one embodiment described herein provides interpretability and/or explainability, indicating which participant and/or entity likely violated the content policy and/or may provide a chunk of text which violates the content policy. Moreover, at least one embodiment described herein does not necessarily requiring re-training the LLM to catch the new or evolving suspicious behavior.

Fine-tuned language models are typically more accurate and have deeper understanding contextual nuances for a specific domain. However, the major obstacle for creating a fine-tuned model is development of a labeled dataset which includes all different types of "misconduct". In contrast, at least one embodiment described herein does not necessarily requiring training the LLM used for identifying of electronic messages that violate the content policy. No labelled training dataset is necessarily required. At least one embodiment described herein may operate with an input of a pre-defined content policy. Off the shelf LLM may be used, which have not been trained (e.g., using labelled data) for the particular task of identifying of electronic messages that violate the content policy.

At least one embodiment descried herein relates to a multi-stage prompting pipeline, optionally based on a RAG architecture, for detection a violation of pre-defined content policies in electronic messages (e.g., emails threads). By dynamically enriching prompts with information derived from the emails, a computing environment executing the detection process is made more accurate and/or more efficient, for example, requiring reduce processing time, reduced utilization of processing resources, and/or reduced memory utilization.

At least one embodiment descried herein may be used for identification of electronic messages that violate a content policy, enabling, for example: corporate communication policy enforcement, data loss prevention such as for businesses/organizations, content safety enforcement, and the like.

At least one embodiment solves the aforementioned technical problem, and/or improves the aforementioned technical field, and/or improves upon the aforementioned existing approaches, and/or provides the practical application of automatic identification violation of a content policy. The following may be implemented by one or more processors executing code. Electronic messages being exchanged over a network are monitored. The monitored messages are analyzed for identifying at least one electronic message likely violating at least one policy clause of a content policy. A large language model (LLM) is prompted with a set of closed-ended prompts corresponding to the policy clause(s) and referring to the electronic message(s). For each respective closed-ended prompt to which the LLM provides a target response, a template prompt corresponding to the respective closed-ended prompt is dynamically interpolated with combinations of entities extracted from the electronic message(s). The LLM is prompted with the interpolated template prompt. The processor computationally evaluates whether the policy clause(s) is violated according to an analysis of responses from the LLM to the interpolated template prompt. The processor instructs access control for the electronic message(s) violating the access policy.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
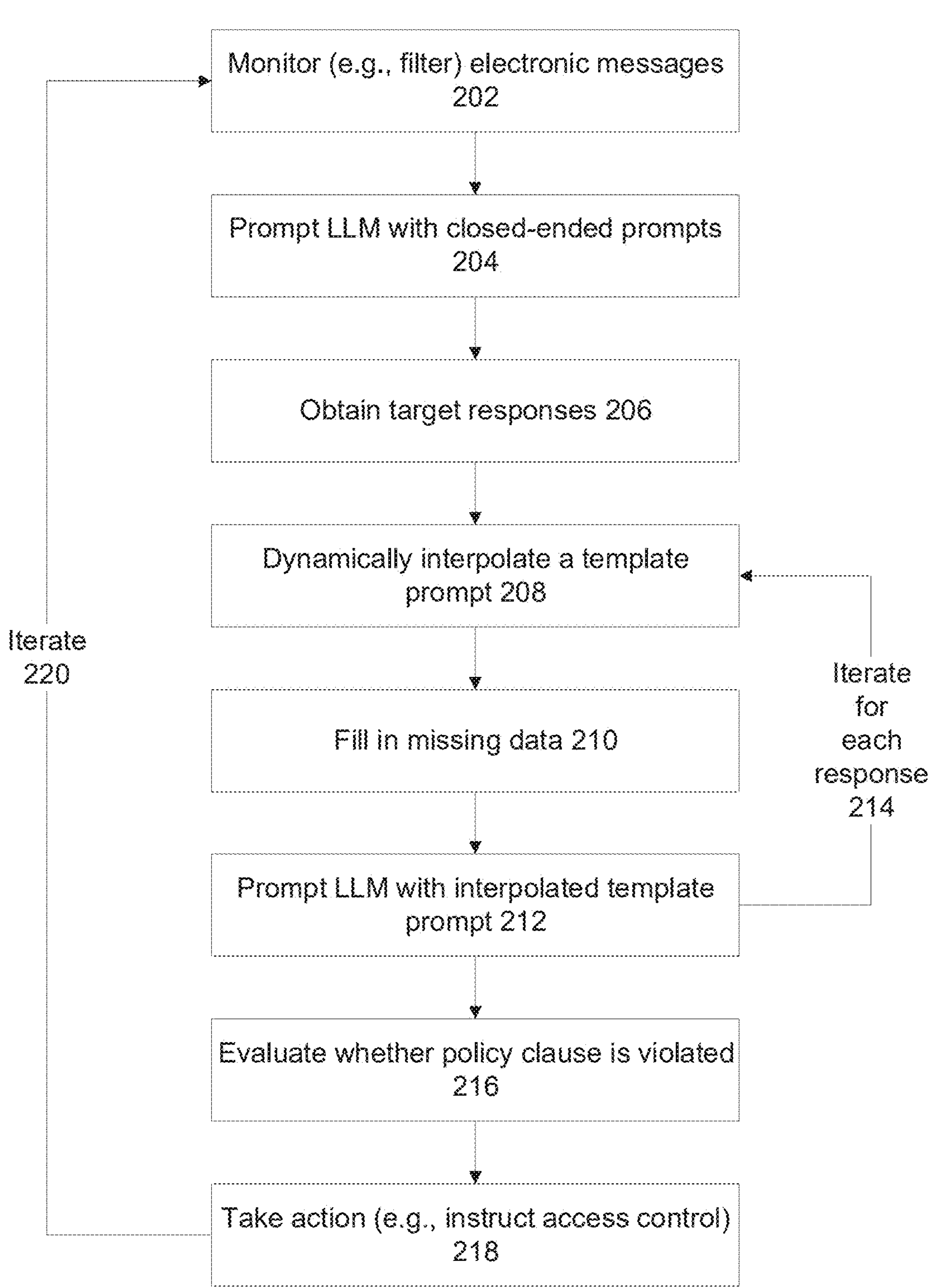
FIG. 2 is a method for automatic identification of violation of a content policy of electronic messages using a LLM, in accordance with some embodiments of the present invention.
Figure 6:
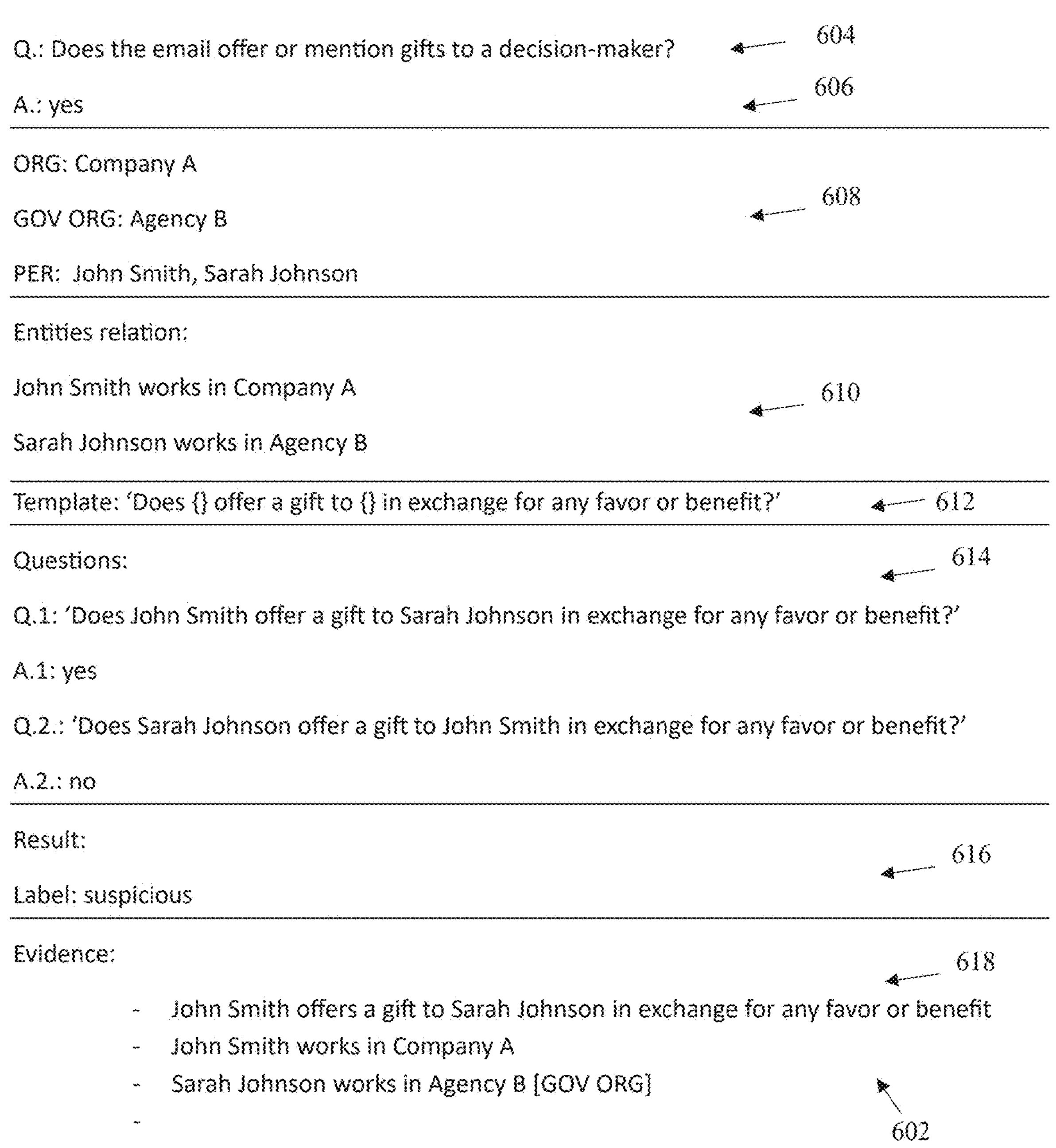
FIG. 6 depicts an example of a process in response to a positive response by the LLM to a closed-ended prompt applied to an email thread, in accordance with some embodiments of the present invention.

Reference is now made to FIG. 1, which is a block diagram of components of a system 100 for automatic identification of violation of a content policy of electronic messages 150 using a LLM 122A, in accordance with some embodiments of the present invention. Reference is also made to FIG. 2, which is a method for automatic identification of violation of a content policy of electronic messages using a LLM, in accordance with some embodiments of the present invention. Reference is also made to FIG. 3, which includes a thread of two emails 302A-B which are being evaluated for violation of a content policy, in accordance with some embodiments of the present invention. Reference is also made to FIG. 4, which includes an example of a content policy 402, in accordance with some embodiments of the present invention. Reference is also made to FIG. 5, which depicts examples of closed-ended prompts 502 created from the content policy of FIG. 4, in accordance with some embodiments of the present invention. Reference is also made to FIG. 6, which depicts an example 602 of a process in response to a positive response by the LLM to a closed-ended prompt applied to an email thread, in accordance with some embodiments of the present invention.

Referring now back to FIG. 1, system 100 may implement the acts of the method described with reference to FIG. 2, by processor(s) 102 of a computing environment 104 executing code instructions stored in a memory 106 (also referred to as a program store).

Computing environment 104 uses LLM 122A to identify electronic messages 150 that violate a content policy (e.g., stored in a repository of content policies 122B) using generated closed-ended prompts (e.g., obtained from a repository of closed-ended prompts 122C) and/or by interpolating one or more templates (e.g., obtained from a repository of templates 122D), as described herein.

Electronic messages 150 may be implemented as, for example, emails, short messages service (SMS) text messages, and messages posted to a multi-participant interactive chat session.

Electronic messages 150 may be hosted by a target computing environment(s) 118 and/or communicated via target computing environment 118.

Target computing environment 118 may be implemented as, for example, an email server, a server hosting the multi-participant interactive session, a network, a computing cloud, a web server, and the like.

Electronic messages 150 may be transmitted between client terminals 108 of different participants over a network 110, for example, via server 118 and/or directly between client terminals.

Computing environment 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing environment 104 may be implemented. For example:

Computing environment 104 executing stored code instructions 106A, may be implemented as one or more servers (e.g., network server, web server, a computing cloud, a virtual server) that provides centralized services to one or more target computing environment 118 and/or client terminals 108. Services may be provided, for example, to one or more target computing environment(s) 118 and/or client terminals 108 over network 110, by accessing and/or being provided the electronic messages(s) 150 associated with the respective target computing environment(s) 118 and/or client terminals 108. Each target computing environment 118 and/or client terminals 108 may be associated with its own content policy, which may be hosted by repository of content policy 122B. Services may be provided by computing environment 104 to client terminals 108 and/or target computing environment(s) 118, for example, as software as a service (SaaS), a software interface (e.g., application programming interface (API), software development kit (SDK)), an application for local download to the client terminal(s) 108 and/or server(s) 118, an add-on to a web browser running on client terminal(s) 108 and/or target computing environment(s) 118, and/or providing functions using a remote access session to the client terminals 108 and/or target computing environment(s) 118, such as through a web browser executed by client terminal 108 and/or target computing environment(s) 118 accessing a web sited hosted by computing environment 104. For example, individual client terminal(s) 108 may filter electronic message(s) being received from other client terminals and/or other computing environment to identify electronic messages 150 that may violate their content policies, and provide the electronic messages 150 to computing environment 104 for centralized analysis as described herein. In another example, computing environment remotely accesses and/or is sent electronic messages(s) 150 hosted by target computing environment(s) 118 for centralized analysis, for example, emails for exchange via a centralized email server. In yet another example, computing environment 104 sniffs and/or intercepts electronic messages 150 being transmitted over network for centralized analysis.

In another example, computing environment 104 may be implemented to provide dedicated and/or local services to a certain target computing environment 118 and/or to a certain client terminal 108. For example, computing environment 104 may be integrated with target computing environment 118 and/or client terminal 108, such as installed thereon and/or code 106A of computing environment 104 may be executed by the processor(s) of target computing environment 118 and/or client terminal 108. In another example, computing environment 104 may be implemented as an external device, such as an administrative server, in dedicated communication with target computing environment 118 and/or client terminal 108, to provide the service of analyzing electronic messages 150 of the target computing environment(s) 118 and/or client terminal 108 using LLM 122A for detecting violation of the content policy, as described herein.

Processor(s) 102 of computing environment 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogeneous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIG. 2 when executed by hardware processor(s) 102.

Computing environment 104 may include a data storage device 122 for storing data, for example, LLM 122A, repository of content policy 122B set for storing one or more content policies, repository of closed-ended prompts 122C set for storing one or more closed-ended prompts, repository of templates 122D set for storing one or more templates designed to be interpolated, and/or other code implemented features, as described herein. Data storage device 122 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing environment 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing environment 104 includes and/or is in communication with one or more user interfaces 126, which may be designed to enable input of data, and/or viewing of data. Exemplary user interfaces 126 include, for example, one or more of, a touchscreen, a display, gesture activation devices, a keyboard, a mouse, and voice activated software using speakers and microphone.

Referring now back to FIG. 2, at 202, electronic messages being exchanged over a network are monitored, optionally filtered.

The filtering (or other monitoring) is performed for identifying at least one electronic message likely violating at least one policy clause of a content policy. The content policy may be defined for users of an organization, online service, message service, and the like. The content policy may indicate what is inappropriate behavior and/or what is appropriate behavior, in terms of content to include in the electronic messages and/or the way the electronic messages are sent.

Examples of policy clauses of the content policy include:

Use email for business-related communication with professionalism and clarity.

Maintain confidentiality; do not share sensitive or proprietary information.

Avoid discriminatory, harassing, or offensive language.

Do not send spam, unauthorized promotions, or large unapproved attachments.

Follow company branding, security protocols, and legal compliance.

The filtering may be performed by a filter that identifies (e.g., extracts) suspicious electronic messages. The filtering and/or monitoring is performed to identify the suspicious electronic messages that will undergo further analysis as descried herein. For example, electronic messages including certain keywords and/or anomalies. The filter may be performed using a computationally efficient processing that is designed to screen the electronic messages, in real-time, near-real time, and/or at least at a rate at which the electronic message are generated.

The electronic messages may include a thread of multiple electronic messages exchanged between multiple participants.

The electronic messages may be implemented as, for example, email, short messages, postings to a common platform such as a chatboard, and the like.

The filtering and/or monitoring may be performed, for example, at the message (e.g., email server), at inboxes of users, at client terminals used by the users, intercepted during transmission over the network (e.g., by the router and/or firewall), sniffed by a sniffer, and the like.

Referring now back to FIG. 3, the thread of two emails 302A-B which are being evaluated for violation of a content policy, is presented.

Referring now back to FIG. 4, exemplary content policy 402, is presented.

Referring now back to FIG. 2, at 204, a LLM is prompted with a set of closed-ended prompts corresponding to the policy clause(s) and referring to the electronic message.

The closed-ended prompts may be implemented as closed-ended questions designed to elicit a binary response from the LLM. For example, the target response generated by the LLM in response to a closed-ended question is a pre-selected binary response, such as YES or NO; TRUE or FALSE, and the like.

The content policy may be written in a natural language text, for example, designed to be read and understood by humans.

The content policy may be automatically converted to the set of closed-ended prompts. Each policy clause may be converted to one or multiple closed-ended prompts, for example, by the LLM, another LLM, by a natural language processing (NLP) process, and the like.

Referring now back to FIG. 5, closed-ended prompts 502 are presented. Closed-ended prompts 502 are arranged as binary questions, designed to elicit binary (e.g., yes or no; true of false) response from the LLM. Closed-ended prompts 502 may be created by converting content policy 402 to binary questions.

Referring now back to FIG. 2, at 206, a set of responses is generated by the LLM in response to the prompting with the set of closed-ended prompts. The set of responses may include different options of the binary possibilities for the binary question.

It is to be understood that each respective closed-end prompt may be individually fed into the LLM, optionally sequentially, and a corresponding response is generated by the LLM.

Features described with reference to 208-212 may be implemented for each respective response generated by the LLM satisfying a requirement, optionally a target response of the options available for the binary response, for example, each target response indicating YES, TRUE, and the like. The other responses which are not the target response, for example, NO, FALSE, may be ignored, and/or may indicate likelihood that the respective response is not associated with violation of the content policy.

At 208, a template prompt corresponding to the respective closed-ended prompt is dynamically interpolated.

The template prompt may be dynamically interpolated with multiple combinations of multiple entities extracted from the electronic message(s), for creating a set of dynamically interpolated template prompts. Multiple instances of the template prompt are each interpolated with a respective permutation of the entities.

Entities may be extracted from a body (e.g., context) of the electronic message. The extraction of entities may exclude extraction from headers and/or indications of to/from sending of the electronic message. Extraction entities from the body (e.g., context) of the electronic message may help to focus on entities discussed in the electronic messages itself, which may be violating the content policy. Entities that are simply listed in the header and/or to/from field may be unrelated to the entities in the body of the electronic messages and likely not violating the content policy. Excluding entities which are likely not violating the content policy helps to reduce errors by the LLM and/or helps focus the LLM on entities which are more likely violating the content policy.

The template prompt may inquire about a specific action made by a specific entity. For example, "Did person A ask person B about { }?".

The template prompt may be dynamically selected from multiple candidate template prompts which may be stored in a repository hosted by a data storage device. The dynamic selection may be according to a correlation with the policy clause(s) likely violated by the electronic message(s). The dynamic selection may be according to a correlation with the filtering and/or monitoring that identified the electronic message(s) as likely violating the content policy, for example, including certain keywords and/or exhibiting certain anomalies. For example, the electronic message(s) may be filtered based on including the term "gift" as likely including content describing gift giving/receiving that violates the content policy. A template prompt for "gift" may be selected. For example, did entity A offer entity B a gift in return for a favor?

At 210, missing data in the interpolated template prompt may be identified.

Examples of missing data include: a role of a target participant(s) participating in the exchange of the electronic messages, location of the target participant(s) in a hierarchy, evidence of an event that happened involving the target participant(s), and evidence of a granting of a gift to/from the target participant(s).

The missing data may be obtained using different approaches. For example:

- A fake electronic message designed to elicit the missing data is automatically generated. The fake electronic message may be sent from a bot to the target participant(s) or other participant(s) selected from the participants participating in the exchange of the electronic messages. The missing data may be extracted from a response electronic message by the target participant(s) to the fake electronic message.
- In embodiments where the LLM generates responses to the interpolated template prompt using a retrieval-augmented generation for question answering (RAG QA) architecture, a retriever model may be instructed to access an external dataset for obtaining the missing data for prompting the LLM in association with the interpolated template prompt.

At 212, the LLM is prompted with the interpolated template prompts.

The LLM may be prompted with each respective interpolated template prompt of a set of generated interpolated template prompts, for example, sequentially prompted.

The LLM may generate responses to the interpolated template prompt using the RAG QA architecture. In implementations in which the electronic message(s) includes a thread of multiple electronic messages, each electronic message may be treated as an independent chunk of data. A retriever model may be instructed to select relevant chunks for prompting the LLM in association with the interpolated template prompt. Chunks from different electronic messages of the thread relevant to the interpolated template prompt may be selected by the retriever model for prompting the LLM.

The RAG QA architecture may be implemented, for example, in scenarios where the electronic message(s) include long email threads. Such long email threads may get truncated (e.g., inadvertently, and/or during feeding into the LLM and/or during other processing). The truncation may cause significant information to be lost. The prompt into the LLL may be missing the truncated information. The RAG QA architecture may help ensure that the LLM is prompted with the information based on the electronic message(s), and is not missing information from the electronic message(s). In other scenarios, in which long threads and/or long electronic messages may be fed into the LLM without truncating, it may be difficult for LLM to concentrate on relevant parts. For example, the LLM may be distracted by irrelevant messages, which may lead to the LLM generating answers that are less accurate that when the LLM is fed shorter chunks. The RAG QA architecture may reduce distractions from the context.

The RAG QA process may select the most relevant chunks of information from the complete electronic message(s) (e.g., email thread), so the pieces of evidence from several electronic messages are combined into a broader context for answer generation.

At 214, features described with reference to 208-212 may be iterated for each respective closed-ended prompt to which the LLM generates a respective target response, to generate and collect multiple responses from the LLM.

At 216, a computational evaluation may be performed to determine whether the content policy is violated by the electronic message(s). Alternatively or additionally, the computational evaluation may be performed to determine whether one or more policy clauses are violated by the electronic message(s).

The computational evaluation may be performed, for example, by applying a set of rules to the responses to the closed-ended prompts, such as by a number of closed-ended prompts to which the LLM generates a certain response, and/or analyzing the target response generated by the LLM such as by the LLM and/or another LLM and/or another model.

The computational evaluation may be performed according to an analysis of the multiple responses from the LLM to the interpolated template prompt.

The computational evaluation may be performed, for example, to determine whether or not the electronic message(s) violated the content policy or did not violate the content policy.

In response to the computational evaluation determining that the electronic message(s) violated the content policy, one or more policy clause(s) which were violated may be identified, for example, by the chunk of content that was used to generate the prompt that led to the response by the LLM that indicated violation of the content policy. The chunk(s) of the electronic message(s) that violated the policy clause(s) may be identified.

At 218, one or more actions may be taken in response to the determination that the electronic message(s) violate the policy clause(s).

Optionally, the action(s) includes instructing access control for the electronic message(s) violating the access policy. Examples of instructing access control include:

- Blocking transmission of the electronic message(s) violating the access policy.
- Automatically suspending an account of a target participant identified as sending the electronic message(s) violating the access policy.

Alternatively or additionally, the action(s) includes identifying one or more target entities violating the access policy. A chunk of content of the electronic message(s) used as basis for determining violation of the access policy, is identified. A violation report including the target entity (or entities) violating the access policy and/or the chunk of content may be generated. The violation report may be provided, for example, sent to a client terminal, stored on a data storage device, forwarded to another server, presented on a display, printed, and the like.

At 220, one or more features described with reference to 202-218 may be iterated, for dynamically and/or real-time and/or near real-time detection of violation of the policy clause(s) in electronic message(s) being exchanged between participants.

The iterations may be performed, for example, in response to detection of new electronic message(s), per time interval (e.g., once per hour, once per 12 hours, once per day, and the like), in response to an event, and the like.

Referring now back to FIG. 6, example 602 of the process in response to the positive response by the LLM to the closed-ended prompt applied to a thread of emails, is presented.

A closed-ended prompt 604 in the form of a binary question is presented. The binary question is of a set of closed-ended prompts 502 described with reference to FIG. 5. The binary question is prompted for being applied to emails 302A-B described with reference to FIG. 3. For example, as described with reference to 204 of FIG. 2.

A binary response 606, i.e., yes, is received from the LLM to binary question 604. For example, as described with reference to 206 of FIG. 2.

A set of entities 608 are extracted from emails 302A-B. The entities may include organizations (e.g., companies, government agencies) and individuals.

Relationships 610 between individuals and organizations may be defined.

A template prompt 612 is selected. Template prompt 612 may be selected based on corresponding to closed-ended prompt 604. For example, as described with reference to 208 of FIG. 2.

Multiple instances 614 of template prompt 612 interpolated with different combinations of entities 610 are generated, and used as prompts for the LLM. For example, as described with reference to 210-214 of FIG. 2.

A response 616 for whether the email thread violated the content policy is generated by the LLM based on the interpolated template prompts 614. For example, as described with reference to 216 of FIG. 2.

Evidence 618 for response 616 generated by the LLM may be provided based on the original text of the emails. For example, as described with reference to 218 of FIG. 2.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant LLMs will be developed and the scope of the term LLM is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of automatic identification of violation of a content policy, comprising:
- filtering at least one electronic message likely violating at least one policy clause of a content policy being exchanged over a network;
- prompting a large language model (LLM) with a set of closed-ended prompts corresponding to the at least one policy clause and referring to the at least one electronic message;
- for each respective closed-ended prompt to which the LLM provides a target response, dynamically interpolating a template prompt corresponding to the respective closed-ended prompt with a plurality of combinations of a plurality of entities extracted from the at least one electronic message;
- prompting the LLM with the interpolated template prompt;
- computationally evaluating whether the at least one policy clause is violated according to an analysis of responses from the LLM to the interpolated template prompt; and
- instructing access control for the at least one electronic message violating the access policy.

2. The computer implemented method of claim 1, wherein the LLM generates responses to the interpolated template prompt using a retrieval-augmented generation for question answering (RAG QA) architecture, wherein the at least one electronic message comprises a thread of a plurality of electronic messages, each electronic message of the plurality of electronic messages is treated as an independent chunk of data, and instructing a retriever model to select relevant chunks for prompting the LLM in association with the interpolated template prompt.

3. The computer implemented method of claim 2, wherein a plurality of chunks from a plurality of different electronic messages of the thread relevant to the interpolated template prompt are selected by the retriever model for prompting the LLM.

4. The computer implemented method of claim 1, further comprising:
- identifying missing data in the interpolated template prompt;
- automatically generating a fake electronic message designed to elicit the missing data;

sending the fake electronic message from a bot to at least one target participant selected from the participants participating in the exchange of the at least one electronic message; and extracting the missing data from a response electronic message to the fake electronic message by the at least one target participant.

5. The computer implemented method of claim 4, wherein the missing data is selected from: a role of the at least one target participant, location of the at least one target participant in a hierarchy, evidence of an event that happened involving the at least one target participants, and evidence of a granting of a gift to/from the at least one target participants.

6. The computer implemented method of claim 1, wherein the at least one electronic message comprises a thread of emails exchanged between a plurality of participants.

7. The computer implemented method of claim 1, wherein the template prompt is dynamically selected from a plurality of template prompts according to a correlation with the at least one policy clause likely violated by the at least one electronic message.

8. The computer implemented method of claim 1, wherein the content policy is written in a natural language text, and further comprising processing the at least one policy clause of the content policy using a natural language processing (NLP) process, and converting the at least one policy clause to the set of closed-ended prompts according to the processing.

9. The computer implemented method of claim 1, wherein the closed-ended prompts comprise a plurality of closed-ended questions designed to elicit a binary response from the LLM, wherein the target response is a pre-selected binary response selected from yes or no.

10. The computer implemented method of claim 1, wherein entities are extracted from a body of the at least one electronic message excluding headers and/or indications of to/from sending of the at least one electronic message.

11. The computer implemented method of claim 1, further comprising:

identifying missing data in the interpolated template prompt;

wherein the LLM generates responses to the interpolated template prompt using a RAG QA architecture, and instructing a retriever model to access an external dataset for obtaining the missing data for prompting the LLM in association with the interpolated template prompt.

12. The computer implemented method of claim 1, wherein a plurality of instances of the template prompt are each interpolated with a respective permutation of the plurality of entities.

13. The computer implemented method of claim 1, wherein instructing access control comprises blocking transmission of the at least one electronic message violating the access policy.

14. The computer implemented method of claim 1, wherein instructing access control comprises automatically suspending an account of a target participant identified as sending the at least one electronic message violating the access policy.

15. The computer implemented method of claim 1, further comprising:

identifying at least one target entity violating the access policy;

identifying a chunk of content of the at least one electronic message used as basis for determining violation of the access policy; and generating a violation report including the at least one target entity violating the access policy and the chunk of content.

16. A system for automatic identification of violation of a content policy, comprising:

at least one processor executing a code for:

filtering at least one electronic message likely violating at least one policy clause of a content policy being exchanged over a network;

prompting the LLM with a set of closed-ended prompts corresponding to the at least one policy clause and referring to the at least one electronic message;

for each respective closed-ended prompt to which the LLM provides a target response, dynamically interpolating a template prompt corresponding to the respective closed-ended prompt with a plurality of combinations of a plurality of entities extracted from the at least one electronic message;

prompting the LLM with the interpolated template prompt;

computationally evaluating whether the at least one policy clause is violated according to an analysis of responses from the LLM to the interpolated template prompt; and instructing access control for the at least one electronic message violating the access policy.

17. A non-transitory medium storing program instructions for automatic identification of violation of a content policy, which when executed by at least one processor, cause the at least one processor to:

filter at least one electronic message likely violating at least one policy clause of a content policy being exchanged over a network;

prompt the LLM with a set of closed-ended prompts corresponding to the at least one policy clause and referring to the at least one electronic message;

for each respective closed-ended prompt to which the LLM provides a target response, dynamically interpolate a template prompt corresponding to the respective closed-ended prompt with a plurality of combinations of a plurality of entities extracted from the at least one electronic message;

prompt the LLM with the interpolated template prompt;

computationally evaluating whether the at least one policy clause is violated according to an analysis of responses from the LLM to the interpolated template prompt; and instruct access control for the at least one electronic message violating the access policy.

* * * * *